Sept. 26, 1950      E. M. HEFFERNAN      2,523,659
THREAD GUARD FOR CASTER WHEELS
Filed Aug. 21, 1948
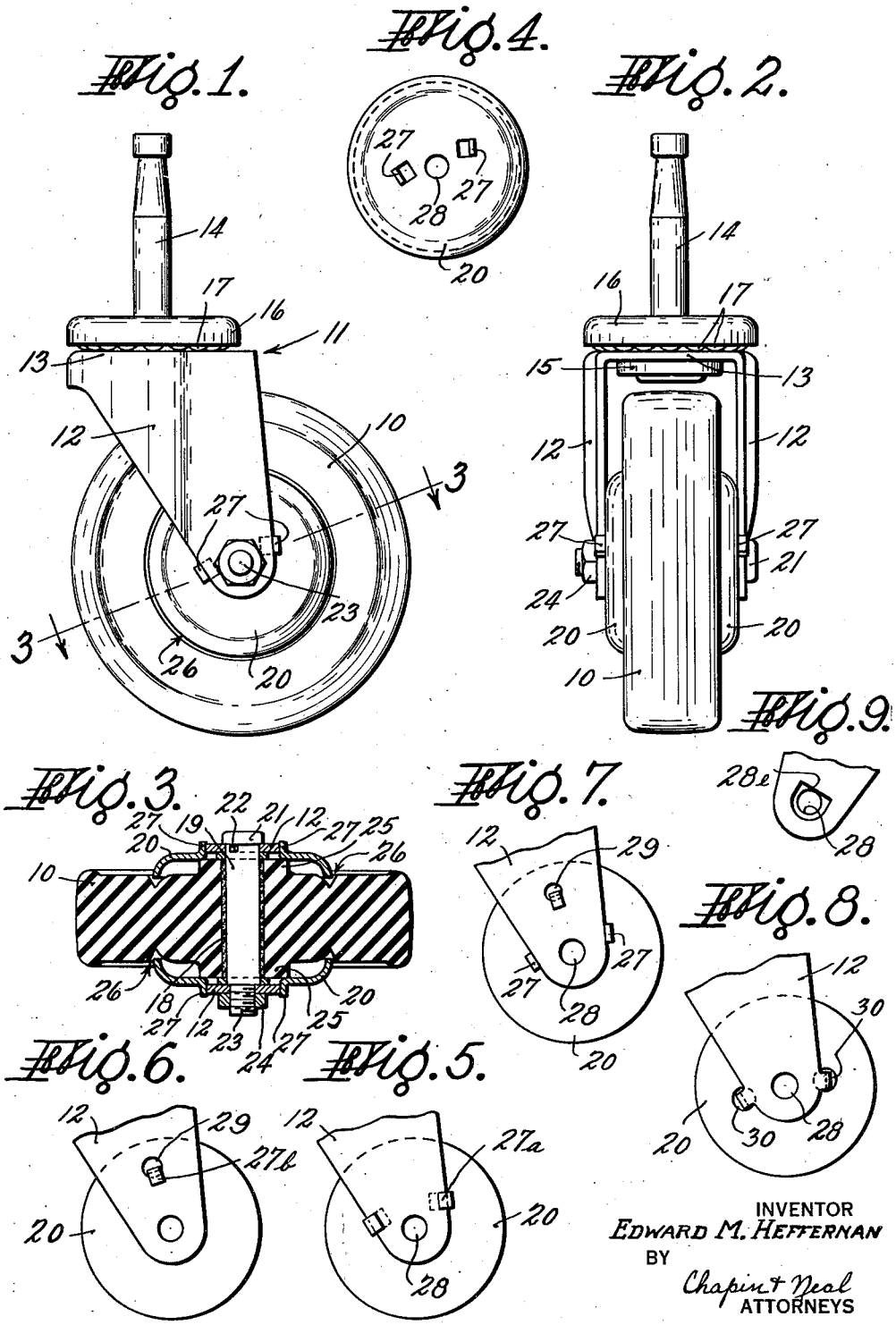
INVENTOR
EDWARD M. HEFFERNAN
BY
Chapin & Neal
ATTORNEYS Patented Sept. 26, 1950

2,523,659

UNITED STATES PATENT OFFICE 2,523,659

THREAD GUARD FOR CASTER WHEELS

Edward M. Heffernan, Monson, Mass., assignor to Jarvis & Jarvis, Inc., Palmer, Mass., a corporation of Massachusetts Application August 21, 1948, Serial No. 45,507

2 Claims. (Cl. 16—18)

1

This invention relates to improvements in caster wheels and thread guards for the axles of the same and has for an object a simplified construction of wheel assembly characterized by efficiency in operation and economy of manufacture.

Such guards are commonly used on caster wheels to prevent an accumulation of thread or lint in the axle bearing of a wheel when the same is used in a textile mill, dry cleaning establishment or other location where loose threads or refuse lint, etc., is likely to cause an axle to bind and stop the rotation of the wheel.

Generally the guards are in the form of dished washers mounted on the axle on each side of the wheel between the wheel and each fork arm. So far as I am acquainted with the prior art, almost universally it has been the practice in the trade to mount a spacer bushing on the axle between the two guards. The axle nut and bolt is then drawn tightly, forcing the guards against the spacer ends to thereby press the guards against rotation with the wheel. Accordingly, the spacer must be precisioned more or less accurately to insure correct dimensions in a given wheel assembly and to enable proper operation thereof. This type of construction has not been economical from the standpoint of manufacturing costs nor has it lent itself to speed in assembly operations. It is not an assembly which can readily be adapted to supplement a standard caster wheel construction.

It is an object of this invention to eliminate the necessity of a spacer element in the caster wheel to be equipped with thread guards. Not only does the new construction eliminate this part but in addition it eliminates the necessity of precision handling in relation to the entire assembly.

A further object is to provide an article which is adapted for mounting on a standard wheel without the need for excessive reworking of the same to accommodate the addition of guards. The new guard may thus be easily adapted for caster wheels at their location of use in the field.

These and other objects and advantages will become apparent from a consideration of the following description and accompanying drawings, in which Fig. 1 is a side elevation of a caster embodying the features of my invention;

Fig. 2 is an end elevation of Fig. 1;

Fig. 3 is a cross section on line 3—3 of Fig. 1;

Fig. 4 is a side elevation of the dished thread guard washer;

2

Figs. 5, 6, 7 and 8 are elevational views showing modifications in the means of locking the guard washers to the forks of the caster yoke; and Fig. 9 is a side elevational view of the end of one caster fork.

In the caster construction as shown generally in Figs. 1 and 2 and in more specific detail, in Fig. 3, a rubber wheel 10 is rotatably mounted in a yoke 11 having spaced forks 12 and a flat top plate or platform 13. A caster stem 14 is swivelably attached to yoke platform 13, as for example by the arrangement illustrated, wherein a flange 15 at the end of the stem abuts the bottom of the yoke platform, and a bearing cap 16 firmly attached to the body of the stem holds ball bearings 17 against the top of the yoke platform. The present invention, however, is not concerned with the caster stem or its attachment which may be of any suitable design, but only with the mounting of wheel 10 in yoke 11.

Rubber wheel 10 preferably has a graphited bushing 18 (Fig. 3) lining its bore for rotation of the wheel on a stationary wheel axle 19. This axle extends through one yoke fork 12, the washer or thread guard 20, the rubber wheel 10, the second thread guard, and the second fork 12.

The term "thread guard" or "thread guard washer" is commonly used in the industry for devices applied to or used with the caster wheel to prevent threads, dirt, lint or other foreign matter from being picked up, accumulating, and binding the wheel against rotation. This term is applied to dished washer 20 herein to describe its most useful function, i. e. preventing threads from wrapping around the caster axle in textile mill or laundry use.

The wheel axle's flattened head portion 21 with lug 22 (Fig. 3) and threaded end 23 with nut 24 provides means for squeezing yoke forks 12 together to hold the thread guard washers closely adjacent to the wheel.

Wheel 10 has hub portions 25 on each face to abut the flat center portion of the dished thread guard washers and a groove 26 cut or molded in each face to receive the peripheral edge of the washers. As shown in Fig. 3 the peripheral edge of each thread guard washer fits into a circular groove 26 so as not to touch or bind the wheel.

To hold the dished thread guard washers against rotation with the wheel, two brackets as ears 27 are stamped or punched from the metal of the flat center portion. The ears fit snugly against the edges of the forks near the bottom of the yoke when the washers are placed in position on the wheel and the assembly slid up into place. Ears 27 provide stops to align the axle bore of the wheel assembly and the axle hole 28 of each fork. It is to be noted that each ear 27 is punched to provide a line contact against the side of fork 12 for ease in assembly. The guard is positioned by slipping the wheel between the forks, the ears 27 guiding the seating of the wheel to a position of alignment with holes 28. The axle may thus be quickly and easily inserted, the nut put on its threaded end and then tightened to complete the assembly.

One of the axle holes 28 through the forks should preferably be cut with a flattened edge 28e as shown in Fig. 9. The corners of this flattened edge will then receive lug 22 on the axle and positively prevent rotation of the axle. The friction between the surfaces of the axle nut 24 and its adjacent yoke fork will also aid in this function.

In the preferred embodiment of the invention as illustrated in Figs. 1, 2, 3, and 4, two of the ears 27 are provided on each thread guard washer. These ears need only be of a length to adequately abut the edges of yoke forks 12 (i. e. only slightly longer than the edge thickness of the metal). And it will be noted that the openings in the surface of the guard metal from which the ears are punched are angled so as to underlie the edge of fork arm 12 and prevent the introduction of dust, etc. The ears, moreover, may be made long enough for each to be bent over the edge of a fork as shown in Fig. 5. When bent over, the ears 27a prevent axial movement of the thread guard washer as well as rotational movement by clamping or "locking" each washer to its yoke fork.

Modifications of the invention may include: that of Fig. 6 wherein a hole 29 is punched in the yoke fork and a single bent over ear 27b provided on the washer to engage this hole; that of Fig. 7 combining the two ears of Fig. 1 and the hole and ear arrangement of Fig. 6; or that of Fig. 8 wherein ears are provided on the yoke forks to engage holes 30 punched in the thread guard washers.

The invention is particularly adapted to improve standard caster equipment now in use. The dished thread guard washers may be supplied suitably punched or stamped and of a size to fit grooves which may be provided in any standard caster wheel. The guards may also be of any diameter desired with relation to the wheel diameter. The size shown by the drawings is considered preferable as having its outer edge approximately half way between the hub of the wheel and its outer periphery. It might be of lesser diameter or of a size to cover the entire side wheel face.

What I claim is:

1. A caster assembly having forked arms, an axle carried between said arms and of uniform diameter from arm to arm, said axle at one end having a bolt head for abutment against one arm and a shouldered threaded portion at the other end; a nut on said threaded end to clamp said other arm against the shoulder of said axle and prevent movement of said latter arm toward the first arm a wheel mounted on said axle with a raised hub portion at each side of said wheel, the cross sectional shape of the wheel taken on a plane which includes the axis of revolution of the wheel being substantially rectangular, and thread guards in the form of circular washers mounted on a each side of the wheel between an arm and its adjacent hub, said guards having eared tabs offset centrally and struck outwardly from the body thereof and lying at each side of the adjacent arm and a peripheral flange on each washer turned inwardly towards said wheel, said wheel having circular grooves in the walls thereof to receive the edges of said guards in slightly spaced relation.

2. A thread guard construction for casters having forked arms carrying an axle of uniform diameter from arm to arm and a one-piece wheel with a central raised hub portion mounted for rotation on said axle, the cross sectional shape of the wheel taken on a plane which includes the axis of revolution of the wheel being substantially rectangular said guard being in the form of a circular washer and for mounting between said wheel and an arm and provided with a central axial mounting hole and spaced tabbed ears offset from said hole and outwardly directed from the body thereof to lie on opposite sides of a fork arm when said guard is mounted on the axle, and an inwardly turned peripheral flange on said guard to lie in closely spaced relation with the side wall of said wheel.

EDWARD M. HEFFERNAN.

REFERENCES CITED

The following references are of record in the file of this patent:

UNITED STATES PATENTS

| Number | Name | Date |
| --- | --- | --- |
| 1,153,838 | Bower et al. | Sept. 14, 1915 |
| 1,285,142 | Happensack | Nov. 19, 1918 |
| 1,861,539 | Lilly | June 7, 1932 |